United States Patent [19] [11] 4,220,311
Wolff [45] Sep. 2, 1980

[54] CLAMPING BLOCK FOR ELECTRICAL HAND DRILL

[76] Inventor: Robert Wolff, Im Kiesacker, Engeln, Fed. Rep. of Germany, 5446

[21] Appl. No.: 32,861

[22] Filed: Apr. 24, 1979

[30] Foreign Application Priority Data

May 13, 1978 [DE] Fed. Rep. of Germany ....... 2821132

[51] Int. Cl.[3] ........................ F16M 11/00; B23B 47/00

[52] U.S. Cl. .................................... 248/645; 248/315; 248/316 R; 248/674; 269/97; 403/4; 408/234; 409/235

[58] Field of Search ................ 408/234, 241; 409/211, 409/228, 235; 269/321 A, 88, 97, 100, 99, 95; 248/314, 315, 316 R, 154, 645, 674; 403/3, 4

[56] References Cited

U.S. PATENT DOCUMENTS

| | | | |
|---|---|---|---|
| 1,208,522 | 12/1916 | Duncan | 269/95 |
| 1,371,617 | 5/1921 | Germanow | 269/95 X |
| 2,556,131 | 6/1951 | Wolfson | 269/95 X |
| 2,616,338 | 11/1952 | Manning | 248/316 R |
| 2,831,376 | 4/1958 | Daniels | 408/112 |
| 2,849,900 | 9/1958 | Heidtman | 408/112 |
| 2,963,926 | 12/1960 | Fantozzi | 269/95 |
| 3,024,018 | 3/1962 | Manz | 269/97 X |
| 3,556,508 | 1/1971 | Varga | 269/95 X |
| 3,827,822 | 8/1974 | Converse | 408/110 |
| 4,076,227 | 2/1978 | Rameson | 269/95 |
| 4,140,307 | 2/1979 | Dalmon et al. | 269/97 |

FOREIGN PATENT DOCUMENTS

| | | | |
|---|---|---|---|
| 110589 | 4/1964 | Czechoslovakia | 248/315 |
| 2025374 | 12/1971 | Fed. Rep. of Germany | 408/234 |
| 899325 | 6/1962 | United Kingdom | 248/674 |

*Primary Examiner*—William R. Briggs
*Attorney, Agent, or Firm*—Abraham A. Saffitz

[57] ABSTRACT

A special clamping block in combination with a screw clamp fitted with a pair of bores, one bore provided on the top face of the screw clamp and the other bore provided on the outer side face of the screw clamp, the special clamping block having a clamping ring at the end thereof adapted to receive the neck of an electrical hand drill at said end and having a projection plug which fits either into the top face bore of the screw clamp or the outer side face bore whereby the drill may be positioned to the side of the screw clamp or over the top surface thereof.

In a preferred embodiment a molded one piece clamping block is formed with supporting struts to strengthen the structure and adjustable clamping projections or fingers are provided at the inner edge of the clamping ring closest to the projecting plug which permit tightening of the clamping ring by tightening screws passing perpendicularly through said fingers to close the slit therebetween or to open the slit by loosening the screws to permit removal of the electrical drill.

6 Claims, 5 Drawing Figures

FIG. 2
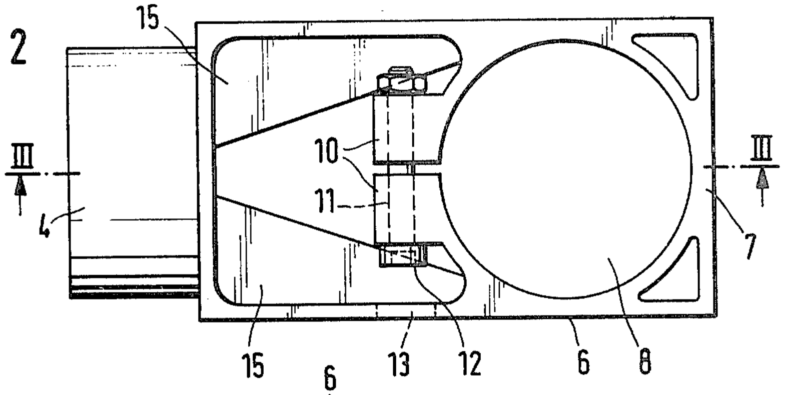
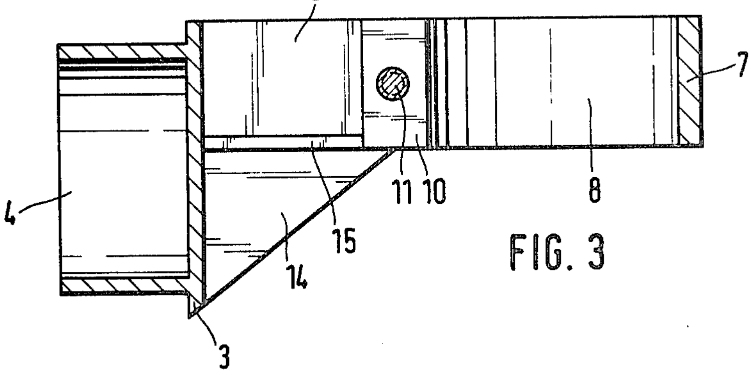
FIG. 3
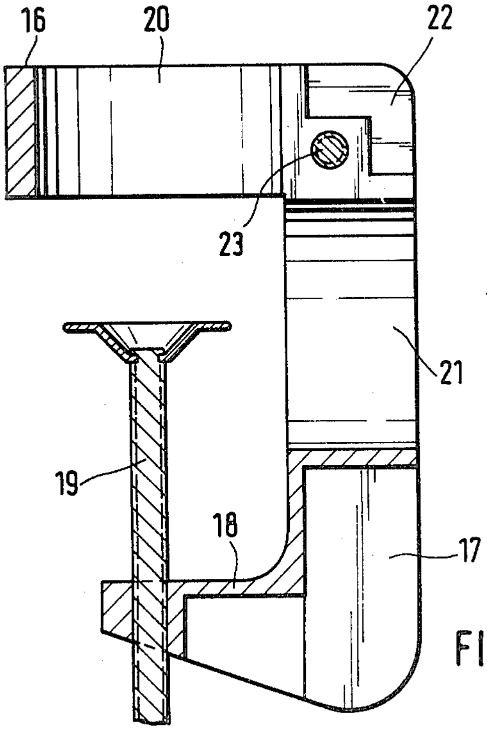
FIG. 4
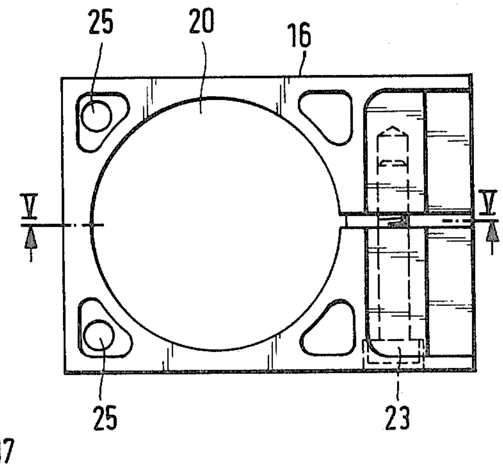
FIG. 5

CLAMPING BLOCK FOR ELECTRICAL HAND DRILL

CROSS REFERENCE TO RELATED APPLICATION

Reference is made to my West German Patent Application No. P 28 21 132.7 filed in Germany on May 13, 1978 and priority claimed thereunder in accordance with 35 U.S.C. 119.

BACKGROUND OF THE INVENTION

1. Field of the Invention

This invention lies in the field of adjustable machine holders in combination with a screw clamp wherein the machine holder is in the form of a two cavity clamping block provided with a clamping ring to receive the neck of an electrical hand drill.

A stationary attachment for an electrical hand drill is often desired and required for various types of drilling, cutting and polishing operations. When one wishes to carry out drilling, cutting, grinding or polishing using an electrical hand drill for insertion at inaccessible places one usually employs flexible shafts in order to transmit the rotation produced at the chuck of the hand drill to the drill bit or tool being attached at the free end of the flexible shaft. In this case the electrical hand drill must be attached in such a manner that the flexible shaft extends without a kink or a bend to the place where the work piece is located for processing.

In the prior art, a clamping block has been proposed for electric hand drills which consists of a pedestal shaped machine holder, the lower end of which is equipped with a support plate and the upper part of which is developed as a clamping ring for the neck of the drill. The known machine holder may either be screwed onto a work bench by means of screws for which corresponding holes are provided in the plate or it may be temporarily fixed with a simple U-shaped screw clamp. With this known clamping block a hand drill may be clamped down in only a few positions.

OBJECTS OF THE INVENTION

The invention has as its object a clamping block which permits the clamping down of the electrical hand drill in various adjustable positions which can be easily changed from one position to another position.

Other and further objects of the invention will become apparent from the summary of the invention, drawings and description of the preferred embodiment as well as the claims.

SUMMARY OF THE INVENTION

The foregoing object is achieved in accordance with the invention by providing a machine mounting block which cooperates in a new manner with a screw clamp adapted to receive the machine mounting block and which is particularly suitable for several tightly secured positions of an electrical hand drill with attachments to assure proper operation in desired perpendicular alignment of the drill, router, sander, etcetera, to the work while being easily demountable to another of several positions to thereby facilitate entering the rotating part in locations with difficult cult access. The screw clamp comprises a generally C-shaped body having a bottom connected to a back of the C-shaped body and a top perpendicular to the back which top serves as a working surface for the operator. The bottom of the C clamp is provided with a threaded bore and a threadedly engaging clamping screw element to serve the conventional purpose of securing the clamp to a table top or similar working support.

The back of the screw clamp and the top of the screw clamp are each provided with a bore in which a clamping ring is formed for the purpose of receiving a joining element of the machine mounting block thereby providing side entry or top entry of the maching mounting block.

The machine mounting block is formed with a rectangular frame portion, an outwardly extending lower triangular extension portion and immediately adjacent the extension portion a projecting plug which is the joining male element interfitting either of the two bores in the top and side of the C clamp body. This rectangular frame portion has a rectangular top which has a front square plate portion (the front is the side closest to the projecting plug) and a rear portion which encloses a bore or cavity for receiving the machine tool, e.g., the electrical hand drill.

In the preferred embodiment the machine mounting block bore is formed with a clamping ring for the electrical hand drill and tightening means are provided in the form of split clamping projections extending forwardly from the ring with a transverse screw means for tightening adjustment and for loosening the drill from the clamping ring.

The preferred cross section of the projecting plug is circular and the clamping ring of the top and side of the screw clamp are of the same cross section and diameter, the depth of plug and bore being sufficient to assure secure engagement in the working position.

A novel feature of the screw clamp double cavity construction is the common split between the projections from the top clamping ring and the projections from the side clamping ring which permits the placement of a transverse tightening screw adjacent to the top corner for tightening either of the two clamping rings with the projecting plug of the machine mounting block in either top or side location of the clamping ring.

A further novel feature of a preferred embodiment is the unitary construction of the machine mounting block which may be molded of any suitable strong material with the projecting plug integral with the rectangular frame of the mounting block body and with the provision of reinforcing struts to strengthen the rectangular frame portion. The molded struts are split apart and tapered at the ends in the direction of the clamping ring portion. Reinforcement by these struts is aided by the action of the tightening screw and thereby diminishes any distortion of the square frame.

The triangular projecting portion of the block below the projecting plug increases the surface of engagement of the mounting block with the screw clamp at the plug connection.

As a result of these foregoing details of construction the combination provides for readily positioning a power drill for clamped manipulation by simple plug connection. The electrical hand drill may be easily plugged into the block and thereafter the clamp, one or more, located in various positions and locations at which the power tool is to be used, for example on a work bench, on a fence slat or on any other suitable support, and the drill need only be plugged into the clamp.

The advantage of the split clamping ring in the mounting block resides in the capability for rotating the hand drill into any desired position with assurance that the transverse tightening screw will place the machine tool in the desired position. The described and illustrated geometry of the mounting block and C body assure proper perpendicular alignment of the rotating drill to the work.

In the described case, where the outside diameter of the projecting plug is equal to the inside diameter of the clamping ring of the machine mounting block, the combination of the device is very adaptable as an accessory to a drill stand fitted with a clamping down mechanism and in this connection the machine mounting block of the invention may be so clamped down.

Although the top and back of the C clamp are preferably rectangular, other shapes may be used but the preferred rectangular section permits the clamping ring for the plug to be molded in the cavity. Particularly with the preferred rectangular section of the back of the screw clamp there is provided the advantage of high elasticity of the common corner projecting walls on opposite sides of the common split between top and side cavity of the screw clamp. The end result is a combination of elements providing surprisingly high strength and stability for securely mounting the hand drill.

BRIEF DESCRIPTION OF THE DRAWINGS

In accordance with the invention the illustration of a preferred embodiment by way of example is shown in the drawings, in which:

FIG. 2 is a top view of the machine mounting block of FIG. 1 with lower parts shown in dotted line;

FIG. 3 is a cross-sectional view taken along section line III—III of FIG. 2;

FIG. 4 is a top view of the screw clamp of FIG. 1 with inner parts shown in dotted line; and FIG. 5 shows a cross-sectional view along section lines V—V of FIG. 4.

DESCRIPTION OF THE PREFERRED EMBODIMENT

Figure 1:
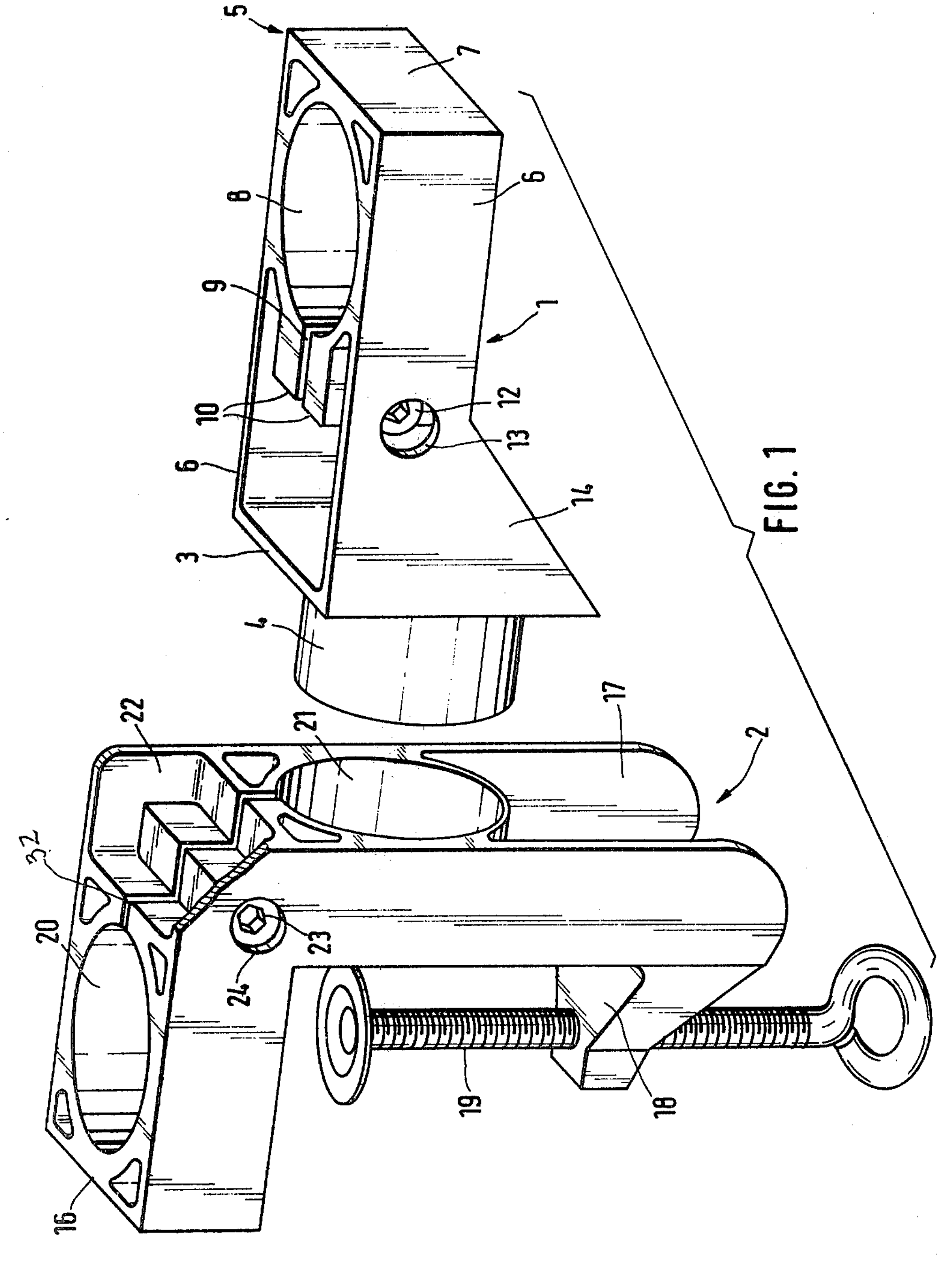
FIG. 1 is an exploded perspective view, partly in section and bracketed, to show the orientation of the machine mounting block to the screw clamp in the invention.

As shown in FIG. 1, the machine mounting block 1 formed with projecting plug 4 interfits with either a top bore or a side bore of the screw clamp 2. The machine mounting block 1 comprises a generally rectangular frame 5 and the plug 4. The frame 5 includes a triangular extension portion 14 at its end adjacent the projecting plug to define an enlarged lateral flat surface adjacent the plug as shown in FIG. 3. This enlarged lateral surface provides the side support for the relatively large diameter projecting plug, e.g., a diameter which is much larger than the side or end wall height of walls 7 and 8 respectively. As shown in FIGS. 1 through 3, the preferred form is in a unitary molded piece.

The frame 5 is formed of two sections and as shown in FIG. 2 one section is in the form of a square plate 3 adjacent plug 4 while the other section behind plate 3 contains the cavity or bore for molded clamping ring 8. The center axis of the clamping ring 8 is perpendicular to the center axis of the projecting plug 4 and assures an alignment of screw clamp and machine mounting block fit when the projecting plug is inserted in a bore of the screw clamp, this alignment assuring alignment of the rotating power tool to the work and work surface.

Clamping ring 8 in the machine mounting block 1 is provided with projections as shown in FIGS. 1 and 2, these adapted to be adjusted towards or away from each other when the power tool is mounted within the clamping ring by means of tightening screw 11 having a head 12 which is accessible for turning with a suitable wrench by the cavity 13 in side wall 6 of the frame 5. The opposing side wall of frame 5 is larger than end wall 7 or side wall 6 as shown in FIG. 3, and triangular extension 14 forms the underpinning for this opposite side which adapts the wall for the relatively large diameter of the projecting plug 4. Wedge shaped ribs 15 are provided as shown in FIG. 2 in the square plate section and these strengthen the frame at the plug end due to their perpendicular orientation to the plug 4. Since the outside diameter of the plug 4 equals the inner diameter of clamping ring 8 it is easy to use the combination clamped to a drill stand to guide the drill in a horizontal position or in a vertical position.

The screw clamp 2, as shown in FIG. 1, comprises the top support arm 16, back arm 17 and threaded bore 18 in the bottom of the C shaped body, the threaded bore receiving the screw element 19. In the preferred embodiment both top arm 16 and back arm 17 are in the form of rectangular framing members. Clamping rings 20 and 21 are molded on the inside walls of the top and side framing members (see FIG. 1) to receive the projecting plug 4 and thereby securely mount the machine mounting block 1. To facilitate the securing engagement of such mounting, a unique continuous slit 32 is formed between the split projections at the top corner of the top 16 of the clamping screw and the split projections at the back. This continuous slit 32 constitutes an adjustable passageway between the top clamping ring 20 and side clamping ring 21 of the screw clamp and is tightened or loosened by a single transverse screw means 23 with head disposed in the recess 24 of the wall adjacent the top corner as shown in FIG. 1.

The top 16 of the C clamp body provides a table support in which openings 25 are provided for additional screw fasteners to facilitate securing parts thereto.

Although the machine illustrated for use with the invention is an electrical hand drill, obviously equivalent power drills may be used with attachments, if desired, such as millers, sanders, buffers, etcetera.

Having thus disclosed the invention, I now claim:

1. In combination, a machine mounting block and a screw clamp to receive said machine mounting block for mounting an electrical hand drill in one of several positions:

said screw clamp comprising a generally C-shaped body having a bottom connected to a back and a top perpendicular to the back, the bottom provided with a threaded bore and an elongated clamping screw element threadedly engaging the bottom, said back of said screw clamp being provided with a bore adapted to receive a projecting plug of said machine mounting block and said top of said screw clamp being provided with a bore adapted to receive a projecting plug of said machine mounting block, thereby providing a double cavity in said screw clamp for back and top portions in mounting an electrical hand drill;

said machine mounting block being formed with a rectangular top formed of a front square plate portion and a back portion, perpendicular sides and end and a projecting plug which is adapted to fit into the back cavity or the top cavity of said screw clamp;

a molded clamping ring in said back portion of said machine mounting block, said clamping ring formed with split clamping projections separated by a slit; and a screw fastening means which passes through said split clamping projections for tightening the clamping projections to fix the electrical hand drill in said clamping ring and for loosening the said projections for removal of the drill from said clamping ring.

2. A combination as claimed in claim 1 wherein said projecting plug has a circular cross section and said clamping ring has a circular cross section, the outside diameter of said projecting plug being substantially equal to the inside diameter of said clamping ring.

3. A combination as claimed in claim 2 wherein the top of said screw clamp is in the form of a rectangular frame and in which a clamping ring is molded with said rectangular frame, said top having its back corner adjacent said clamping ring split in communication with said clamping ring to thereby form two projecting elements integral with said ring which are split apart with threaded bolt means passing through said projections to tighten the clamping ring for mounting the projecting plug of said machine mounting block.

4. A combination as claimed in claim 3 wherein the top of the cavity in the back of the screw clamp is formed as a split clamping ring with projections at the top, the projection defining a split therebetween which is in the same plane as the split between the projection in the top clamping ring of said screw clamp.

5. A combination as claimed in claim 4 wherein the closing adjustment of the split projection at the back cavity clamping ring is effected by the same threaded means as closes the top cavity clamping ring of said screw clamp.

6. A combination as claimed in claim 5 wherein said machine mounting block is formed by molding as a unitary piece with the projecting plug integral with the square plate of the top thereof, said square plate being provided with molded struts at each of the inner sides thereof to strengthen the rectangular frame, said molded struts being both split and tapered at the ends directed toward the clamping ring portion and a tightening screw means passing through said molded struts to thereby reinforce the clamping engagement of said projecting plug without distortion of said machine mounting block.

* * * * *